May 26, 1936.  H. C. PARKER  2,042,121
PROCESS OF EXTRACTING GOLD FROM SALINE SOLUTIONS
Filed Aug. 4, 1934
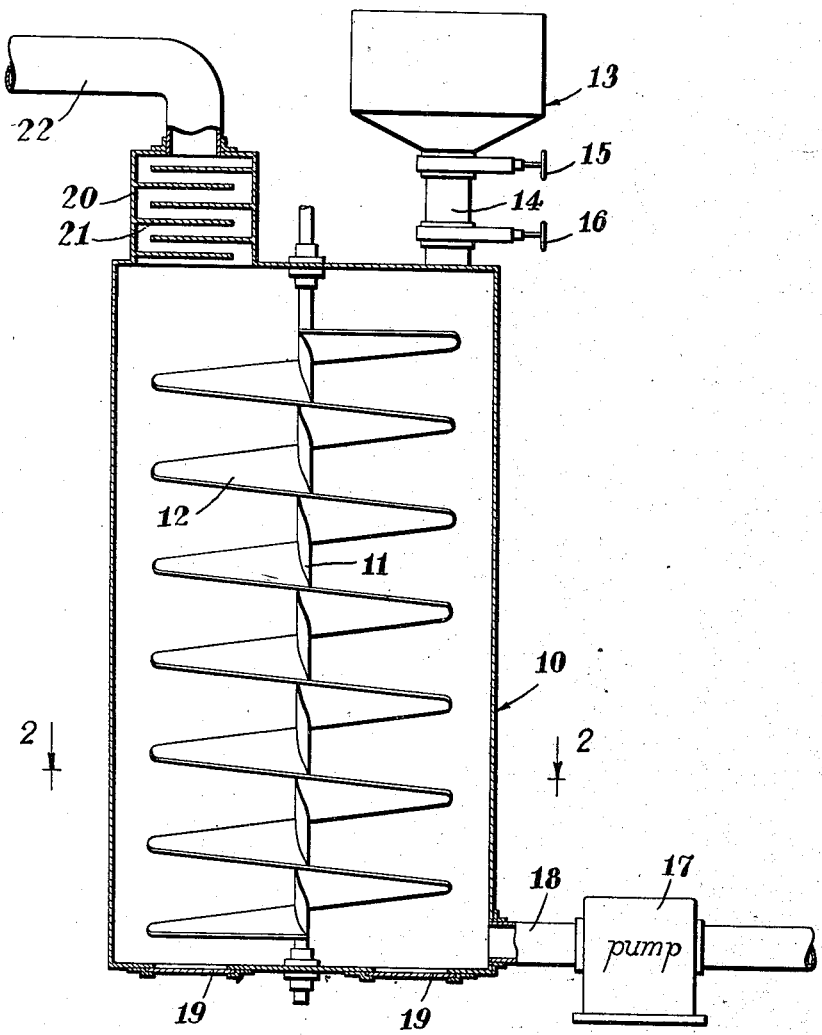
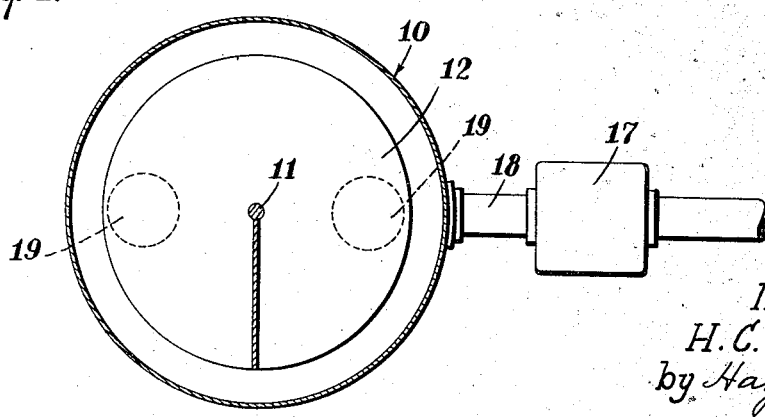
Inventor
H. C. Parker
by Hazard & Miller
Attorneys.

Patented May 26, 1936

2,042,121

UNITED STATES PATENT OFFICE 2,042,121

PROCESS OF EXTRACTING GOLD FROM SALINE SOLUTIONS

Herschel C. Parker, Los Angeles, Calif., assignor of one-half to John William Chard, Los Angeles, Calif.

Application August 4, 1934, Serial No. 738,566

3 Claims. (Cl. 75—109)

My invention relates to a process of extracting gold from solutions.

Ocean water adjacent gold bearing coasts or to the mouths of rivers carries gold in solution or suspension and also bays or inlets in these regions have been found to carry gold in varying amounts up to ten cents and even higher value per ton of water. Gold is also found in the saline waters of land-locked lakes, such as the Great Salt Lake, Utah, and Mono Lake, California.

It has been long known that ocean water carries small quantities of gold in solution, probably as a chloride. The amount, however, was considered far too small for any hope of discovering a method of any commercial value for extracting the gold therefrom. The amounts usually given by investigators are from one-tenth to two cents of gold per ton of sea water. Probably the most accurate determination on record is that made by the Scripps Institute of Oceanography, La Jolla, California, several years ago. The tests made give approximately four milligrams of gold or about one-half cent per ton of water. The method used in determining the amount of gold consists in evaporating a ton of water to dryness and then making a quantitative analysis of the dry residue for gold.

Gold chloride, however, when heated with an excess of sodium chloride is volatile. Therefore, the gold found in the residue was considerably less than actually present in the sea water under treatment. It is remarkable that any gold whatever was found in the residue.

After carrying out extensive experiments along the Pacific Coast and Mono Lake by means of electric currents, mercury, lead and iron, to determine whether there were any saline solutions that carried gold in commercial quantities, I developed a process for extracting gold by means of finely powdered ferrous sulphide. In all of the methods just mentioned promising results were obtained when the solutions were enriched by gold chloride. In all natural saline solutions, however, the most erratic results were obtained, ranging without any apparent cause whatever from thirty cents per ton and higher to a mere trace.

I have discovered an agent, namely; metallic nickel in the form of a fine powder to be a most effective means for extracting gold from saline solutions. Agitating gold bearing saline solutions with powdered nickel obtained remarkable and consistent results irrespective of whether the solutions were diluted or saturated.

My invention consists in the steps of extracting gold from saline solutions by the use of powdered nickel as hereinafter described and claimed.

In the accompanying drawing, which forms a part of the specification, I have illustrated an apparatus suitable for carrying out my process, and in which:

Fig. 1 is a vertical section with parts in full elevation of the apparatus.

Fig. 2 is a horizontal section taken on the lines 2—2 of Fig. 1.

Referring to the drawing: 10 indicates a suitable closed container, preferably cylindrical in shape and provided with a suitable stirring or agitating means consisting of a vertical shaft 11 journaled in the bottom and top, respectively, of the container 10, and driven by suitable means, not shown. Agitator arms 12, which may be in the shape of a helical scroll are arranged so that on rotation of the shaft in one direction the liquid will be agitated and moved upwardly against the action of gravity.

13 is a hopper-shaped container for the reception of powdered nickel provided with an outlet chute 14 controlled by valves 15 and 16. The saline solution is supplied to the tank 10 by means of a suitable pump 17 in a pipe line 18 entering the container 10 near the bottom. 19 has suitable outlet valves 19 in the bottom of the container 10 for the removal of the gold enriched nickel. 20 is the outlet from the container 10 preferably arranged at the top thereof and comprises a series of baffle plates 21 in staggered relation, as shown, which prevent the particles of nickel from passing on with the waste water through the outlet pipe 22.

Operation

Metallic nickel, which may be of commercial grade, is granulated or pulverized in any preferred manner to a fineness to pass through a from 100 to 200 mesh screen, 150 mesh being preferred. The smaller the particles, the greater the surface exposed and the more efficient the extraction of the gold will be. The granulated nickel is introduced into the container 10 by means of the nickel receptacle 13, using approximately one pound of nickel to a ton of water to be treated, and the saline solution containing the gold is pumped into the container 10 by means of pump 17. The nickel particles are subjected to violent agitation by means of the stirring blades 12, which, as mentioned before, are so arranged as to move the nickel particles upwardly with the result that there is a violent agitation of the particles of nickel through the body of water. The gold is efficiently extracted from the water and is deposited on the tin particles. This deposit may be due to any one or a combination of the three following causes: (1) reduction by replacement, that is, a portion of the nickel goes into solution while the gold is precipitated on the nickel particles; (2) adsorption; (3) catalytic action. It requires about one minute to treat one ton of sea water.

The gold is precipitated on the nickel in the form of a finely divided metallic powder up to 15–20% of the weight of the nickel. When it is desired to periodically remove the gold enriched nickel the pump 17 and the rotation of the blades 12 is stopped, whereupon the nickel and the gold adhering thereto quickly settle down to the bottom of the container 10 from which they may be removed through the outlet valves 19. I have found that it is not necessary to provide screens in the outlet pipe 22 to prevent any particles of nickel passing out with the waste water, these particles being sufficiently heavy that the baffle plates 21 prevent their egress from container 10. All the gold recovered from the saline solution adheres to the nickel particles and may be readily removed therefrom by cupellation, smelting, or any other preferred refining process.

I have found that the ocean along the coast of Southern California at some places yields as much as twenty cents in gold per ton, Great Salt Lake, Utah, forty cents, and Mono Lake, California, sixty cents.

However, the most economic operation of the process is not to extract substantially all or even a major portion of the gold contained in the solution under treatment, in view of the fact that there is practically an unlimited supply of gold bearing sea water or other saline solutions. It is more profitable to subject the water to the nickel treatment at a fairly high rate of speed, the object being to cause the nickel to be in contact with a solution as rich in gold as possible. Therefore, it will be desirable to continuously pump fresh water in the apparatus irrespective of the fact that a certain portion of the gold originally contained in the water passes out through the waste pipe 22. It will be appreciated that the process, to be profitable, must be carried on on a large scale, requiring a great outlay of capital and relatively enormous quantities of water must be treated, and the commercial success of the process will depend on operating the system at the point of maximum efficiency, having regard to the cost of operation, inclusive of capital, investment, maintenance, taxes, and the like.

Various changes may be made by those skilled in the steps of the process without departing from the spirit of my invention as claimed.

I claim:

1. A process of extracting gold from saline solutions comprising passing a gold bearing saline solution through a container in the presence of granular nickel, agitating the solution for a time sufficient for the nickel to extract an appreciable percentage of gold from the solution, and separating the gold enriched nickel from the solution.

2. A process of extracting gold from saline solutions comprising passing a gold bearing saline solution through a container in the presence of granular nickel of a size of 100 to 200 mesh, and agitating the solution for a time sufficient for the nickel to extract an appreciable percentage of gold from the solution, and separating the gold enriched nickel from the solution.

3. A process of extracting gold from saline solutions comprising passing a gold bearing saline solution through a container in the presence of granular nickel of a size to pass through a 100 to 200 mesh, using a quantity of one pound of nickel to a ton of the solution to be treated, agitating the solution for a time sufficient for the nickel to extract an appreciable percentage of gold from the solution, and separating the gold enriched nickel from the solution.

HERSCHEL C. PARKER.